United States Patent
Abe et al.

(10) Patent No.: US 9,040,647 B2
(45) Date of Patent: May 26, 2015

(54) PHOTOCHROMIC MATERIAL

(75) Inventors: Jiro Abe, Kanagawa (JP); Atsuhiro Tokita, Tokyo (JP); Takeru Horino, Tokyo (JP); Toyoji Oshima, Tokyo (JP); Atsushi Kimoto, Hyogo (JP)

(73) Assignees: MITSUBISHI GAS CHEMICAL COMPANY, INC., Tokyo (JP); Jiro Abe, Kanagawa (JP)

( * ) Notice: Subject to any disclaimer, the term of this patent is extended or adjusted under 35 U.S.C. 154(b) by 462 days.

(21) Appl. No.: 13/514,620

(22) PCT Filed: Nov. 30, 2010

(86) PCT No.: PCT/JP2010/071345
§ 371 (c)(1),
(2), (4) Date: Jun. 8, 2012

(87) PCT Pub. No.: WO2011/070942
PCT Pub. Date: Jun. 16, 2011

(65) Prior Publication Data
US 2012/0245317 A1    Sep. 27, 2012

(30) Foreign Application Priority Data
Dec. 11, 2009 (JP) .................... 2009-281966

(51) Int. Cl.
| | | |
|---|---|---|
| C08F 126/06 | (2006.01) | |
| C08F 226/06 | (2006.01) | |
| G03C 1/73 | (2006.01) | |
| C08F 20/02 | (2006.01) | |
| C08F 20/34 | (2006.01) | |
| C08F 20/36 | (2006.01) | |
| C09K 9/02 | (2006.01) | |

(52) U.S. Cl.
CPC . *G03C 1/73* (2013.01); *C08F 20/02* (2013.01); *C08F 20/34* (2013.01); *C08F 20/36* (2013.01); *C09K 9/02* (2013.01)

(58) Field of Classification Search
USPC ......................................... 526/259
See application file for complete search history.

(56) References Cited

U.S. PATENT DOCUMENTS

2011/0306743 A1* 12/2011 Abe et al. .................. 526/219.6

FOREIGN PATENT DOCUMENTS

| JP | 5-105730 | 4/1993 | |
|---|---|---|---|
| JP | 7-62021 | 3/1995 | |
| JP | 7-82266 | 3/1995 | |
| JP | 2002-332480 | 11/2002 | |
| JP | 2004-123922 | 4/2004 | |
| WO | 2010/061579 | 6/2010 | |
| WO | WO 2010061579 A1 * | 6/2010 | ............... G03C 1/73 |

OTHER PUBLICATIONS

Atsushi Kimoto et al., "Fast Photochromic Polymers Carrying (2.2)Paracyclophane-Bridged Imidazole Dimer", Macromolecules, vol. 43, No. 8, Mar. 26, 2010, pp. 3764-3769.
Kazuto Inaba et al., ""(2,2) Paracyclophane Kakyogata HABI Polymer no Photochromism"", The Chemical Society of Japan Koen Yokoshu, vol. 90, No. 3, Mar. 12, 2010, pp. 899 (G8-36).
Atsushi Kimoto et al., ""(2,2) Paracyclophane Kakyogata HABI o Yusuru Sokusagata Polymer to sono Photochromism"", The Chemical Society of Japan Koen Yokoshu, vol. 90, No. 3, Mar. 12, 2010, pp. 899 (G8-37).
Yuta Kishimoto et al., "A Fast Photochromic Molecule That Colors Only under UV Light", J/A/C/S, Journal of American Chemical Society, vol. 131, No. 12, Mar. 10, 2009, pp. 4227-4229.
Hiroaki Kozai et al., "Hexaaryl Bisimidazole Yudotai o Monomer Unit to suru Hikari Kassei Polymer no Gosei to Hikari Kagaku Tokusei", The Chemical Society of Japan Koen Yokoshu, vol. 89, No. 1, Mar. 13, 2009, pp. 616.
Shohei Yamaguchi et al., "The Chemical Society of Japan Nishi Taikai Koen Yokoshu", The Chemical Society of Japan Nishi Taikai Koen Yokoshu, vol. 2009, Nov. 7, 2009, pp. 257.
Fumiyasu Iwahori et al., "Rational design of a new class of diffusion-inhibited HABI with fast backreaction", Journal of Physical Organic Chemistry, vol. 20, Mar. 12, 2007, pp. 857-863.
Search report from International Application No. PCT/JP2010/071345, mail date is Feb. 15, 2011.
Extended European Search Report issued Aug. 7, 2013, in European Application No. 10835864.9-1301.

* cited by examiner

*Primary Examiner* — Ling Choi
*Assistant Examiner* — Chun-Cheng Wang
(74) *Attorney, Agent, or Firm* — Greenblum & Bernstein, P.L.C.

(57) ABSTRACT

Provided are: a method for controlling the decoloration reaction rate and color density of a fast light-modulating material to levels suitable for practical use; and a fast light-modulating material having a decoloration reaction rate and a color density which are suitable for practical use. A polymer obtained by polymerizing a paracyclophane-bridged hexaarylbisimidazole compound having a radical-polymerizable group, and a copolymer obtained by copolymerizing the compound with a (meth)acrylic acid compound or a sensitizer having a radical-polymerizable group can achieve controlled decoloration reaction rates, photosensitivity and color tones.

22 Claims, 12 Drawing Sheets

Results of transient absorption measurements

Comparison of colored body half-lives between monomer (dotted line) and homopolymer 1-1 (solid line)

Results of transient absorption measurements (Comparison between homopolymer and copolymers)

Comparison of ultraviolet-visible absorption spectra between decolored bodies

Solid line: photochromic molecule wherein $R_4$ to $R_7$ are hydrogens

Dotted line: photochromic molecule wherein $R_4$ to $R_7$ are methoxy groups

Ultraviolet-visible absorption spectra

Solid line: homopolymer of photochromic molecule wherein $R_4$ to $R_7$ are hydrogens Dotted line: homopolymer of photochromic molecule wherein $R_4$ to $R_7$ are methoxy groups Result of transient absorption measurements Solid line: homopolymer of photochromic molecule wherein $R_4$ to $R_7$ are methoxy groups Dotted line: photochromic molecule monomer wherein $R_4$ to $R_7$ are methoxy groups Absorption spectrum of colored body of copolymer Result of transient absorption measurements of copolymer Solid line:    copolymer ☐:    homopolymer of photochromic molecule wherein $R_4$ to $R_7$ are methoxy groups ○:    homopolymer of photochromic molecule wherein $R_4$ to $R_7$ are hydrogens Comparison of colored body absorption spectra of films Solid line: film prepared from homopolymer of photochromic molecule wherein $R_4$ to $R_7$ are hydrogens Dotted line: film prepared from homopolymer of photochromic molecule wherein $R_4$ to $R_7$ are methoxy groups Result of transient absorption measurement of film of homopolymer 1-1

Transient absorption measurement of copolymer film

Result of transient absorption measurement of film of homopolymer 1-2

Ultraviolet-visible absorption spectra

Solid line: homopolymer of photochromic molecule wherein $R_4$ to $R_7$ are hydrogens Dotted line: copolymer of photochromic molecule wherein $R_4$ to $R_7$ are hydrogens, methyl methacrylate and photosensitizer

PHOTOCHROMIC MATERIAL

TECHNICAL FIELD

The present invention relates to a light-modulating dye that is used in, for example, optical materials including sunglasses and optical modulators, materials for devices such as recording materials and displays, and printing materials such as inks and coating agents which enable switching of display/non-display and coloring/decoloring.

BACKGROUND ART

Photochromic materials that show photochromism in which coloring/decoloring occurs by a photoreaction have been used mainly for light-modulating dyes for sunglasses, and the like. Furthermore, studies are proceeding with recording materials such as optical disks and display materials such as holograms.

In light-modulating materials for sunglasses, spiropyran-based compounds, naphtopyran-based compounds, fulgide-based compounds, diarylethene-based compounds and the like have been used, but there were disadvantages that they have low decoloration reaction velocities at a room temperature, for example, the color remains for a while after moving from outside to inside, the color does not go out even one enters a tunnel while driving and restoration of the eyesight in front is delayed, and the like.

Under such situation, as shown in Non-Patent Literature 1 (first generation HABI) and Non-Patent Literature 2 (second generation HABI), the inventors have developed radical diffusion-inhibited photochromic molecules whose decoloring reactions are extremely quick and the half-lives of colored bodies are short times in increments of milliseconds.

CITATION LIST

Non-Patent Literatures

Non-Patent Literature 1: Journal of Physical Organic Chemistry 20, pp 857-863 (2007)
Non-Patent Literature 2: Journal of American Chemical Society 131 (12), pp 4227-4229 (2009)

SUMMARY OF INVENTION

Technical Problem

It is expected that, in the case when a light-modulating material for sunglasses is prepared by using the radical diffusion-inhibited photochromic molecules, the above-mentioned disadvantages can be overcame since the decoloration reaction velocity is high. However, since the above-mentioned molecules have too higher decoloration reaction velocities than those of photochromic molecules that have been put into practical use until now, a method for controlling the reaction velocities and coloration concentrations thereof to suitable ones was required so as to broaden the practical uses thereof.

As an example of the problem of the above-mentioned radical diffusion-inhibited photochromic molecules, a problem that, when they are used as light-modulating materials for sunglasses, even the light-modulating materials are irradiated with excitation light to form colored bodies, the colored bodies do not accumulate since the time required for returning to decolored bodies is extremely short as in increments of milliseconds, and thus the coloration concentrations are low (difficult to be colored) is exemplified. Therefore, a method for decreasing the reaction velocity from a colored body to a decolored body is necessary so as to improve the coloration concentration or to attain a desired coloration concentration.

The present invention has been made in view of the above-mentioned, and provides a method for decreasing a decoloration reaction velocity, a method for improving sensitivity against excitation light, and a method for controlling a color tone aiming at developing a photochromic material having practical reaction velocity and coloration concentration, and also provides photochromic materials prepared by these methods.

Solution to Problem

In order to solve the above-mentioned problem, the present inventors first proceeded intensive studies on a method for controlling the photoresponse velocity of a high-speed photoresponsive photochromic molecule.

It is considered that a photochromic molecule represented by the general formula (I) becomes a colored body when the two imidazole rings become imidazolyl radicals and those radicals are in an approximately parallel state, and becomes a decolored body when the two imidazolyl radicals bind and one of the imidazole rings has a steric configuration so that it is approximately vertical to other ring. Therefore, they have reached a concept that the decoloration reaction velocity can be decreased by binding at least either one of the imidazole rings to a polymer main chain so that the imidazole ring becomes difficult to be returned to the vertical state.

Based on the above-mentioned conjecture, they have found polymerization of a photochromic molecule having a polymerizable functional group represented by the general formula (I) to form a polymer or oligomer.

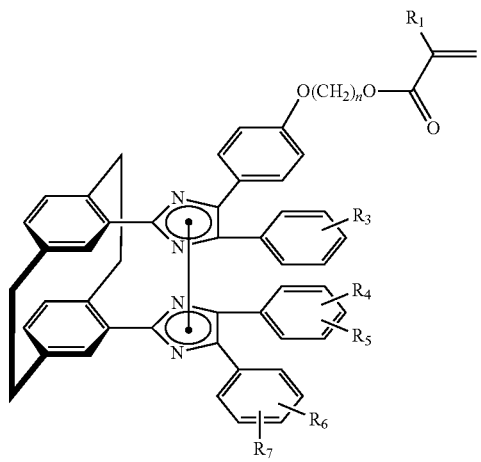

General formula (I)

A photochromic molecule homopolymer 1-1 having the following structure was synthesized by polymerizing the photochromic molecule represented by the general formula (I). As shown in FIG. 1, since this polymer has a longer half-life of a colored body than that of the monomer, it is understood that the decoloration reaction velocity was decreased effectively.

Homopolymer 1-1

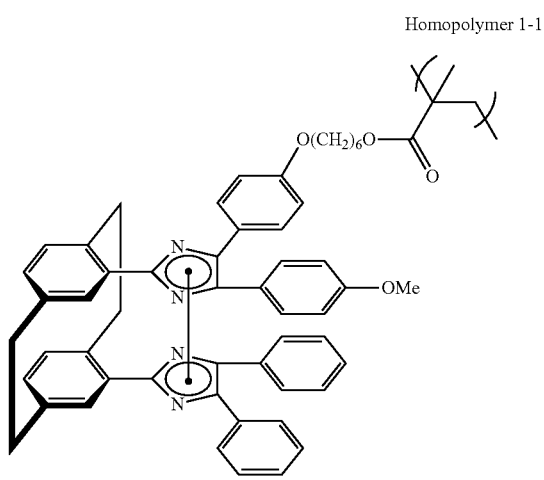

Furthermore, it was also found that the half-life can be extended and an effect of decreasing the decoloration reaction velocity can be obtained as in the above-mentioned homopolymer, as shown in FIG. 2, by polymerizing the photochromic molecule having a polymerizable functional group represented by the general formula (I) and methyl methacrylate or a photosensitizer having a polymerizable functional group as represented by the general formula (II).

General formula (II)

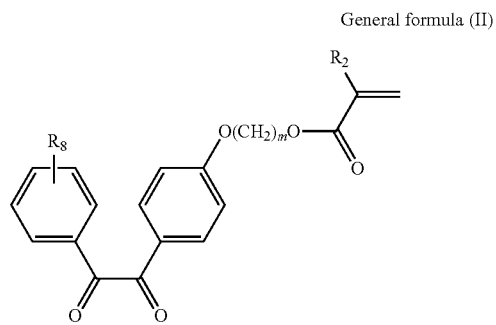

Furthermore, they have done intensive studies aiming at improving the sensitivity against excitation light, and found that the ultraviolet-visible absorption of the photochromic molecule of the decolored body is increased at the longer wavelength side by introducing an electron-donating functional group into any or all of $R_4$ to $R_7$ of the photochromic molecule represented by the general formula (I), and thus it became possible to obtain a photochromic molecule that can generate a colored body efficiently even by irradiation of visible light.

As shown in FIG. 3, for example, in the case when all of $R_4$ to $R_7$ are methoxy groups, the ultraviolet-visible absorption of the decolored body is more increased at the longer wavelength side than that in the case when all are hydrogens.

Furthermore, as shown in FIGS. 4 and 5, it was found that a homopolymer synthesized by polymerizing this photochromic molecule wherein $R_4$ to $R_7$ are methoxy groups which generates a colored body with fine sensitivity even by irradiation of visible light is a material having an effect of decreasing the decoloration reaction velocity by polymerization and an effect of fine visible light sensitivity in combination.

Furthermore, a colored body of a copolymer of a photochromic molecule wherein all of $R_4$ to $R_7$ are hydrogens and a photochromic molecule wherein all of $R_4$ to $R_7$ are methoxy groups in the general formula (I) has an absorption spectrum that is a simple sum of the absorption spectra of the colored bodies of the respective molecules. Therefore, it was found that the colored body has a color of the sum of the two photochromic molecule colored bodies after irradiation of excitation light, and the color of the colored body of the photochromic molecule wherein all of $R_4$ to $R_7$ are hydrogens which has a fast decoloring velocity first goes out, and the color then changes gradually over time. It was found from this fact that it is possible to control the color tone of the colored body by changing the mixing ratio of molecules having colored bodies having different colors (FIG. 6 and FIG. 7).

A film was prepared on a glass substrate by using a polymer of the photochromic molecule, and it was found as the result thereof that the absorption spectrum of a colored body is approximately identical with the spectrum of the polymer in a solvent and the color tone of the colored body can also be controlled even in a film state (FIG. 8).

Advantageous Effects of Invention

By using the polymer including a photochromic molecule of the present invention, it becomes possible to decrease the decoloration reaction velocity of or control the color tone of a high-speed photochromic molecule, thereby a light-modulating material having an improved coloration concentration and a controlled color tone can be provided.

DESCRIPTION OF EMBODIMENTS

<Photochromic Material of the Present Invention>

Figure 1:
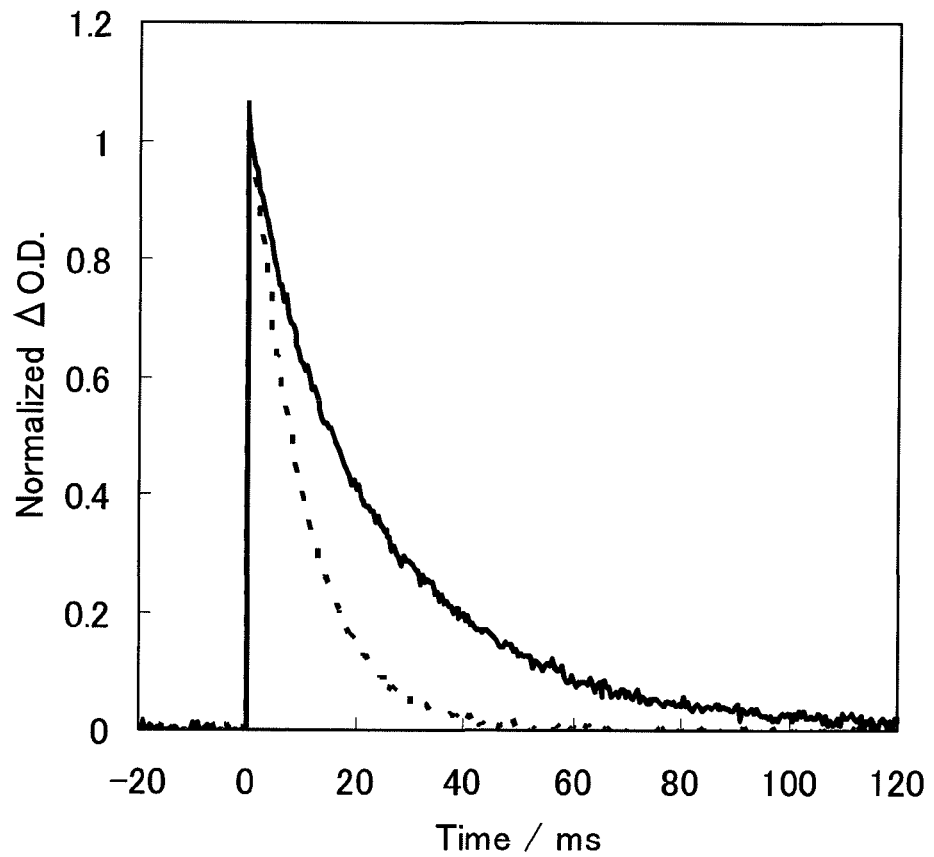
FIG. 1 shows the comparison of the colored body half-lives between a monomer and homopolymer 1-1 by transient absorption measurements.

The present invention is characterized in that a polymer or oligomer is synthesized by polymerizing a photochromic molecule monomer represented by the general formula (I).

General formula (I)

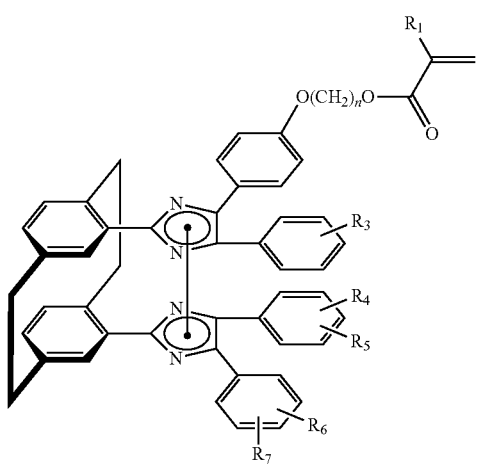

Furthermore, in the present invention, it is also possible to synthesize a homopolymer by polymerizing a photochromic molecule monomer, and to synthesize a copolymer by mixing a photochromic molecule with other polymerizable monomer or a photosensitizing compound having a polymerizable group as represented by the general formula (II). This copolymer may be a block copolymer or a random copolymer.

General formula (II)

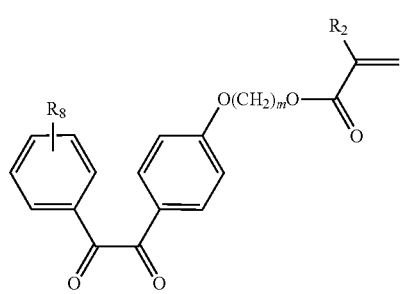

The photochromic monomer molecule represented by the general formula (I) will be explained. The photochromic molecule of the present invention is a derivative of a hexaarylbisimidazole (HABI), and has a backbone in which the triphenylimidazole groups are dimerized by the binding of the 2-positions of the imidazole groups at the paracyclophane.

The substituents $R_1$ to $R_8$ in the general formula (I) and general formula (II) will be explained. $R_1$ and $R_2$ each independently represents hydrogen or a methyl group. $R_3$ to $R_8$ are each independently hydrogen or various substituents. In the case when $R_3$ and $R_8$ are not hydrogens but substituents, the positions of substitution thereof are preferably the para-positions. In the case when $R_4$ to $R_7$ are not hydrogens but substituents, the positions of substitution thereof are preferably the para-positions, and in the case when two substituents are bound to one ring, the positions of substitution thereof are preferably the meta- and para-positions.

As the substituents, an alkoxy group, an amino group, an alkylamino group, an alkyl group, a hydroxyl group, a halogen, a cyano group or a nitro group, and the like can be exemplified. Among these, molecules having an alkoxy group or an alkylamino group are preferable for increasing a coloration concentration in the sunlight since the decolored bodies thereof also absorb the visible light region efficiently and the photochromic molecules themselves have small decoloration reaction velocities.

Preferable alkoxy groups may include a methoxy group, an ethoxy group, a propoxy group, a butoxy group, a pentyloxy group and a hexyloxy group. Preferable alkylamino groups may include a dimethylamino group, a diethylamino group, a dipropylamino group and a dibutylamino group.

n and m indicate natural numbers, and it is preferable, but is not limited to, that n=6 or more and m=6 or more so as to increase the polymerization degree of the photochromic molecule. Specifically, n is preferably 2 to 20, more preferably 4 to 20, and specifically preferably 6 to 20. Furthermore, m is preferably 2 to 20, more preferably 4 to 20, and specifically preferably 6 to 20.

Various general compounds can be used as a polymerization initiator for radical polymerization, but a reaction under a high temperature is not preferable for preventing the damage of the photochromic molecule. From this viewpoint, it is preferable to use 2,2'-azobis(2,4-dimethylvaleronitrile), 2,2'-azobis(4-methoxy-2,4-dimethylvaleronitrile) and the like, but the polymerization initiator is not limited to these exemplified compounds.

The radical polymerizable monomer to be copolymerized may include compounds having a group such as acrylic acid, methacrylic acid, acrylic acid esters, methacrylic acid esters, styrene, acrylonitrile, vinyl acetate and the like.

Furthermore, the photosensitizing compound may be a photosensitizing compound having a polymerizable group, and may include the compound represented by the general formula (II), and the like. Specific examples may include benzyl, methoxybenzyl, benzophenone, methoxybenzophenone, aminobenzophenone, dimethylaminobenzophenone, xanthone, thioxanthone, acetophenone, butyrophenone, propiophenone, anthrone, fluorene, triphenylene, anthraquinone, pyrene, naphthalene, anthracene, phenanthrene, chrysene, coronene, biphenyl, benzaldehyde and the like.

In addition, in the present invention, it is necessary to introduce a functional group for polymerization in each compound so as to synthesize a polymer. Although the polymerizable functional group is not specifically limited as long as it causes a polymerization reaction, examples may include groups such as acrylic acid, methacrylic acid, acrylic acid esters, methacrylic acid esters, styrene, alkylstyrenes, acrylonitrile, acrylamide, methacrylamide, vinyl acetate, butadiene, epoxy, propylene oxide and vinyl chloride.

The solvent used for the polymerization of the photochromic molecule according to the present invention may include THF, toluene and the like. Furthermore, as the conditions for polymerization, the polymerization temperature is preferably 30 to 150° C., more preferably 30 to 100° C., and specifically preferably 30 to 60° C., and the reaction time is, although it differs depending on the reaction temperature and the required molecular weight, preferably 2 hours to 1 week, more preferably 1 to 5 days, and specifically preferably 2 to 4 days.

<Method for Controlling Decoloration Reaction Velocity, Photosensitivity or Color Tone using Photochromic Material of the Present Invention>

The photochromic material according to the present invention can provide decoloration reaction velocities suitable for various applications by controlling the too high decoloration reaction velocity that the photochromic molecule monomer represented by the general formula (I) has, by polymerizing the monomer to give a polymer or oligomer as mentioned above.

Specifically, the decoloration reaction velocity can be controlled to be low by polymerizing a photochromic molecule (monomer); however, it is difficult to unambiguously define the relationship between the polymerization degree and decoloration reaction velocity by a specific numerical value since the relationship also depends on the structure of the photochromic molecule (monomer). Furthermore, in order to decrease the decoloration reaction velocity, the polymer is not necessarily a homopolymer of the photochromic molecule, and other polymerizable monomer such as methyl methacrylate and photosensitizers having a polymerizable group and the photochromic molecule may be copolymerized.

Figure 4:
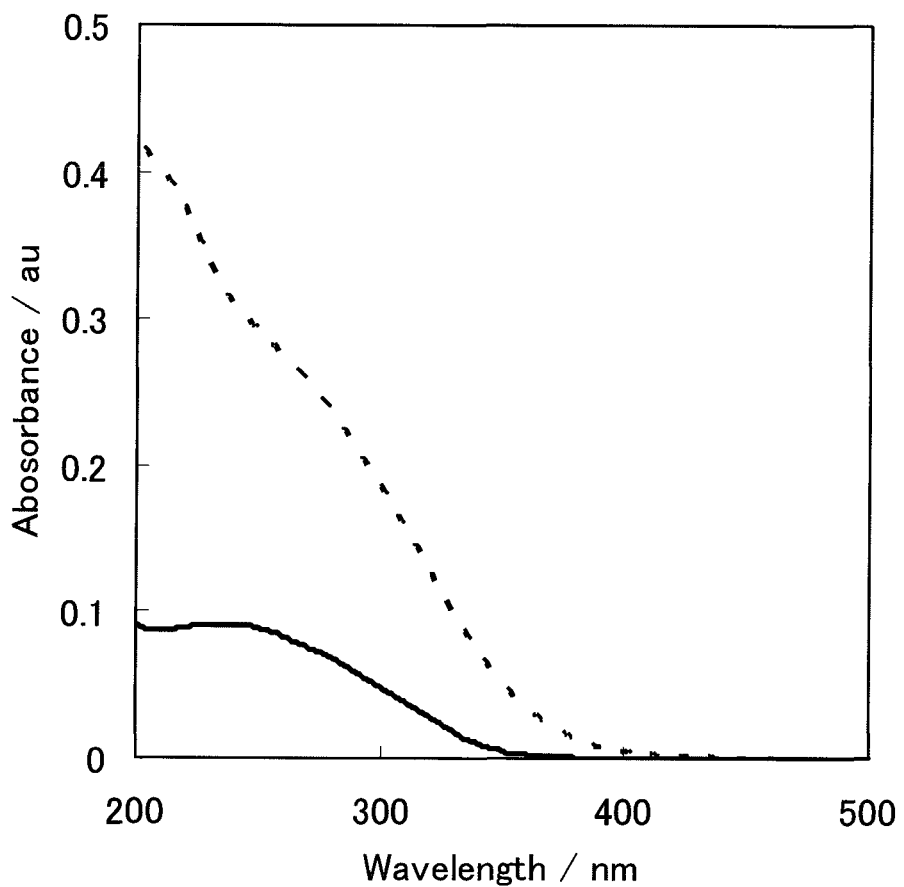
FIG. 4 shows the comparison of the ultraviolet-visible absorption spectra between the homopolymer of the photochromic molecule wherein $R_4$ to $R_7$ are hydrogens and the homopolymer of the photochromic molecule wherein $R_4$ to $R_7$ are methoxy groups.
Figure 12:
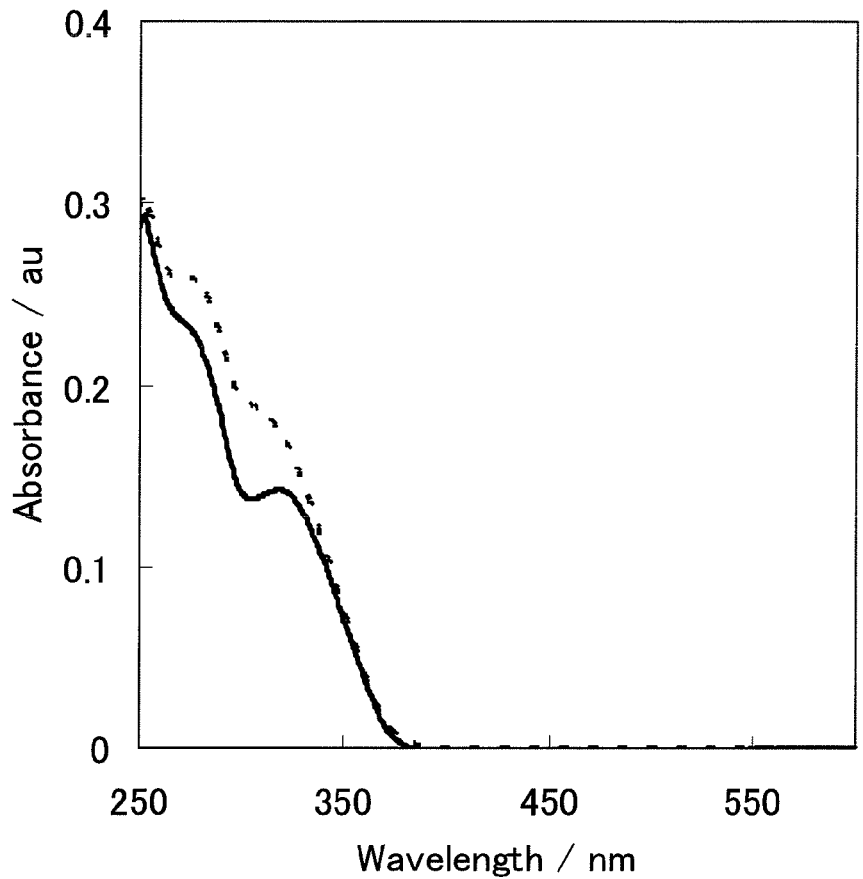
FIG. 12 shows the comparison of the ultraviolet-visible absorption spectra between the homopolymer and copolymer.

Furthermore, as shown in FIG. 12, the amount of absorption of light is increased more and the photosensitivity is improved more by copolymerization with the photosensitizer than the case of the photochromic molecule alone. By introducing an electron-donating functional group into the photochromic molecule, the ultraviolet-visible absorption is also increased at the longer wavelength side as shown in FIG. 4, thereby the visible light sensitivity can be increased.

Figure 6:
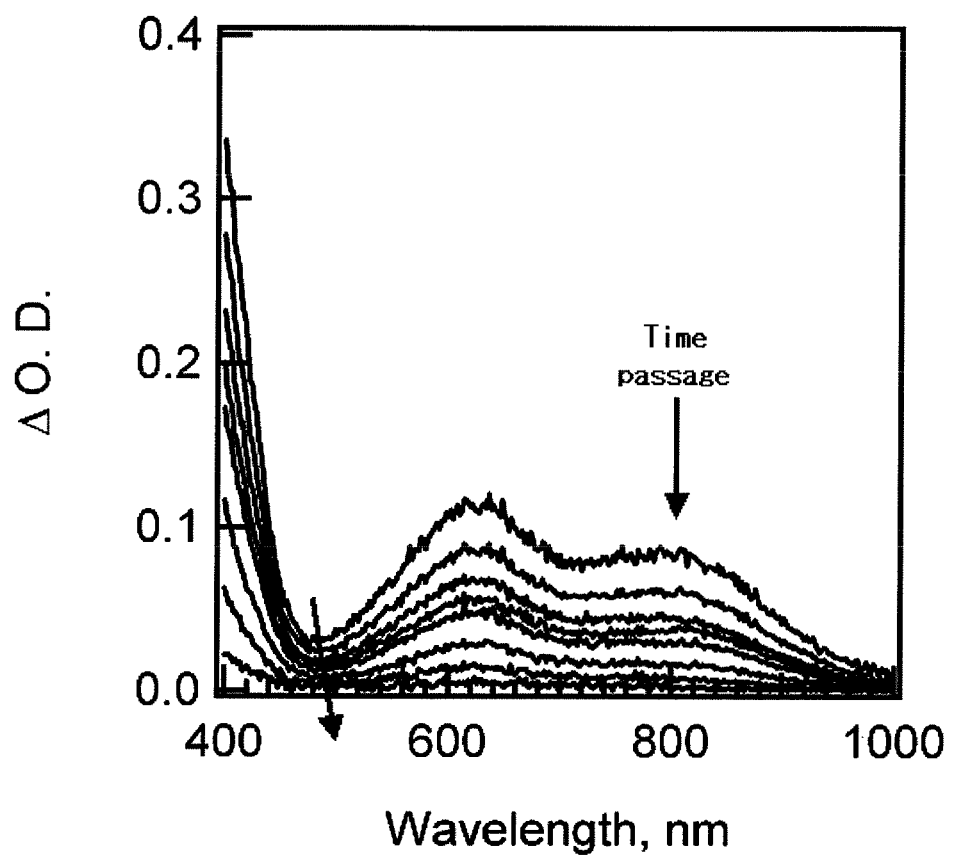
FIG. 6 shows the absorption spectrum of the colored body of the copolymer of the photochromic molecule wherein $R_4$ to $R_7$ are hydrogens and the photochromic molecule wherein $R_4$ to $R_7$ are methoxy groups.
Figure 7:
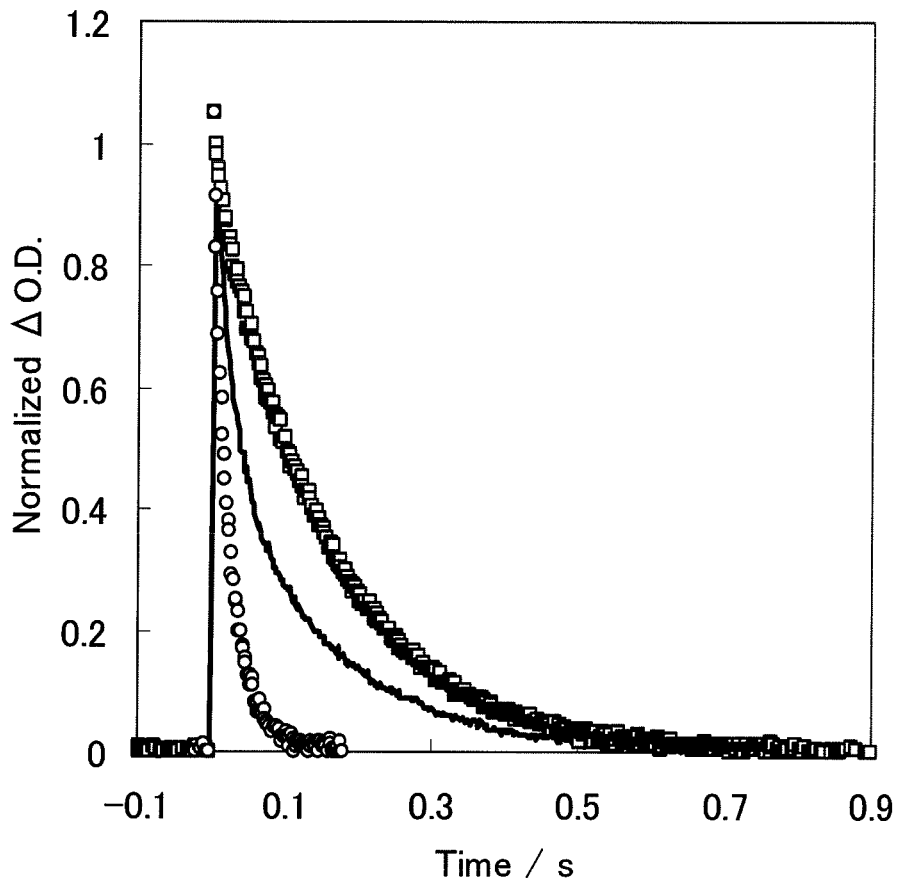
FIG. 7 shows the transient absorption measurement of the colored body of the copolymer of the photochromic molecule wherein $R_4$ to $R_7$ are hydrogens and the photochromic molecule wherein $R_4$ to $R_7$ are methoxy groups, which is compared with those of the homopolymer of the photochromic molecule wherein $R_4$ to $R_7$ are methoxy groups and of the homopolymer of the photochromic molecule wherein $R_4$ to $R_7$ are hydrogens.
Figure 8:
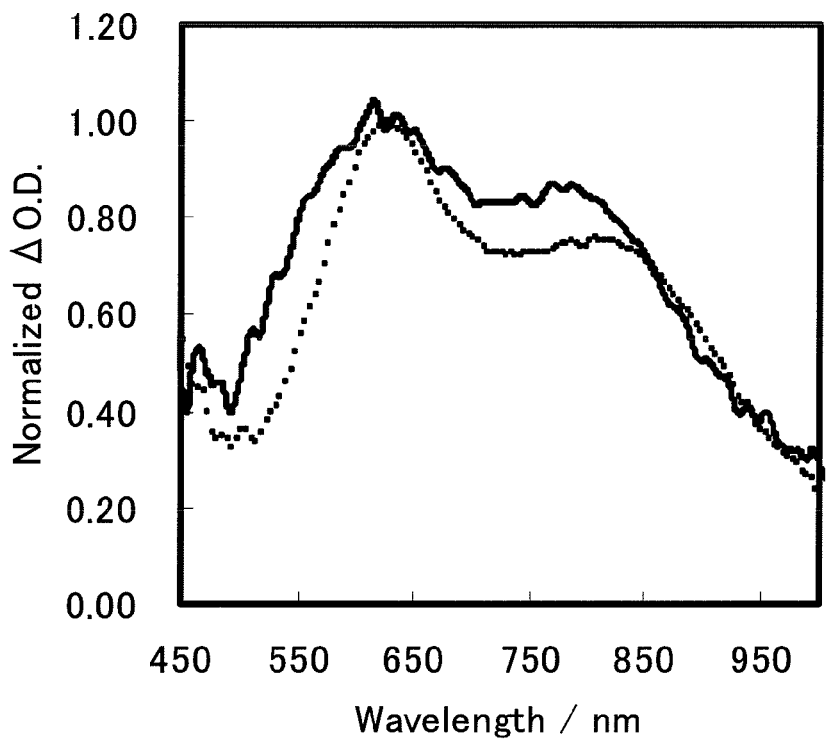
FIG. 8 shows the comparison of the colored body absorption spectra between the film prepared with the homopolymer of the photochromic molecule wherein $R_4$ to $R_7$ are hydrogens and the film prepared with the homopolymer of the photochromic molecule wherein $R_4$ to $R_7$ are methoxy groups.

Furthermore, as shown in FIG. 6 and FIG. 7, it is possible to control the color tone of the colored body by changing the mixing ratio of two or more photochromic molecules having colored bodies with different colors. However, it is difficult to unambiguously define a specific mixing ratio since it depends on the structures of the photochromic molecules (monomers).

EXAMPLES

Example 1

Homopolymer of Photochromic Polymer

An example of a method for the synthesis of a photochromic molecule monomer represented by the general formula (I) is shown below.

First, 0.96 g of compound 1-4 (paracyclophane dialdehyde) was obtained by referring to a known synthesis method (such as Chemische Berichte 120, 1825-1828 (1987)).

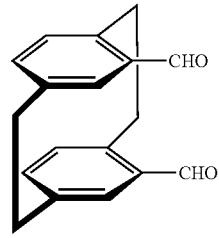

Compound 1-4

Next, 6.0 g of 4,4'-dimethoxybenzyl and 13.3 g of pyridinium chloride were reacted by heating to 180° C. and stirring for 3 hours. This reaction liquid was separated by water and ethyl acetate, and the ethyl acetate layer was separated. This ethyl acetate layer was concentrated, and extraction was conducted by adding dichloromethane. The solid that remained unsolved was removed by filtration. An aqueous NaOH solution (10% by weight) was added to the filtrate to separate the liquid. The aqueous layer was neutralized by adding hydrochloric acid (35%), and the precipitated solid was collected by filtration to give 1.2 g of compound 1-5.

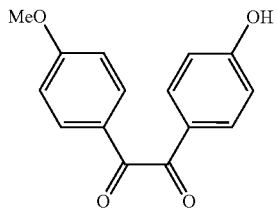

Compound 1-5

Next, 1.00 g of the compound 1-5, 0.755 g of potassium carbonate and 0.013 g of potassium iodide were dissolved and suspended in 14 mL of DMF, 0.8 mL of 6-chloro-1-hexanol was added, and heating was conducted at 80° C. for 1.5 hours. The reaction solution was separated by water and ethyl acetate, and the organic layer was separated, concentrated, and dissolved by adding dichloromethane. The precipitated solid was collected by adding hexane thereto, thereby 1.3 g of compound 1-6 was obtained.

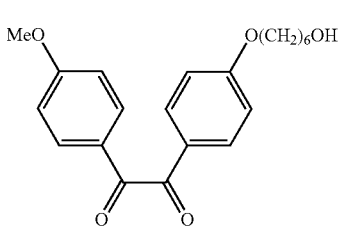

Compound 1-6

The measurement results of $^1$H-NMR and $^{13}$C-NMR of the compound 1-6 are shown below.

$^1$H-NMR (500 MHz, CDCl$_3$) δ: 7.95-7.92 (m, 4H), 6.97-6.94 (m, 4H), 4.04 (t, J=6.5 Hz, 2H), 3.88 (s, 3H), 3.66 (t, J=6.5 Hz, 2H), 1.84-1.81 (m, 2H), 1.62-1.59 (m, 2H), 1.52-1.44 (m, 4H), 1.32 (s, 1H).

$^{13}$C-NMR (125 MHz, CDCl$_3$) δ: 193.88, 193.83, 165.19, 164.79, 132.71, 126.70, 126.46, 115.06, 114.62, 68.65, 63.17, 55.97, 32.96, 29.33, 26.13, 25.84.

Next, a container containing 1.0 g of the compound 1-6 and 6.1 mg of parahydroxyphenol was purged with nitrogen, 6 mL of dichloromethane was added thereto, and ice-cooling was conducted. Thereafter 0.86 mL of triethylamine and 0.52 mL of methacryloyl chloride were added, and a reaction was conducted at a room temperature for 3 hours. Liquid separation was conducted by adding water to the reaction liquid to separate the organic layer, hexane was added, and the precipitated solid was collected to give 1.0 g of compound 1-7.

Compound 1-7

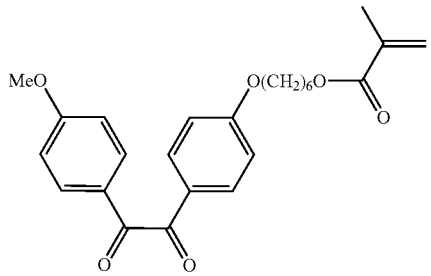

The measurement results of $^1$H-NMR and $^{13}$C-NMR of the compound 1-7 are shown below.

$^1$H-NMR (500 MHz, CDCl$_3$) δ: 7.96-7.92 (m, 4H), 6.98-6.94 (m, 4H), 6.09 (s, 1H), 5.55 (s, 1H), 4.16 (t, J=7.0 Hz, 2H), 4.04 (t, J=7.0 Hz, 2H), 3.89 (s, 3H), 1.94 (s, 3H), 1.84-1.73 (m, 2H), 1.57-1.39 (m, 4H).

$^{13}$C-NMR (125 MHz, CDCl$_3$) δ: 193.87, 193.82, 167.85, 165.18, 164.75, 136.82, 132.71, 126.69, 126.48, 125.57, 115.04, 114.62, 68.58, 64.90, 55.96, 29.25, 28.87, 26.08, 25.99, 18.66.

Next, 0.5 g of the compound 1-4, 0.40 g of benzyl and 2.19 g of ammonium acetate were dissolved in 8 mL of acetic acid and heated at 100° C. for 5 hours. The reaction solution was neutralized with aqueous ammonia, and the product was extracted with dichloromethane. The dichloromethane layer was concentrated, and the product was separated by silica gel column chromatography to give 0.38 g of compound 1-8.

Compound 1-8

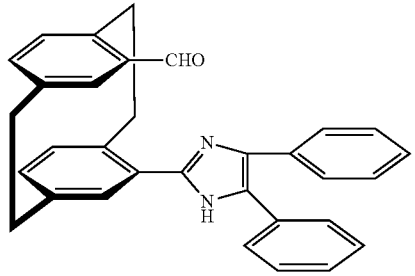

The measurement results of $^1$H-NMR and $^{13}$C-NMR of the compound 1-8 are shown below.

$^1$H-NMR (500 MHz, DMSO-d$_6$) δ: 12.14 (s, 1H), 9.55 (s, 1H), 7.58 (d, J=7.5 Hz, 2H), 7.51 (d, J=7.0 Hz, 2H), 7.47 (dd, J=7.5 Hz, 2H), 7.40 (t, J=7.0 Hz, 1H), 7.31 (dd, J=7.0 Hz, 2H), 7.16 (t, J=7.0 Hz, 1H), 7.10 (s, 1H), 6.96 (s, 1H), 6.84 (d, J=7.5 Hz, 1H), 6.71 (d, J=8.0 Hz, 1H), 6.66 (d, J=7.5 Hz, 2H), 4.49-4.45 (m, 1H), 3.95-3.92 (m, 1H), 3.15-2.97 (m, 6H).

$^{13}$C-NMR (125 MHz, CDCl$_3$) δ: 190.45, 145.29, 140.38, 140.17, 138.52, 138.15, 138.10, 136.78, 136.57, 136.10, 135.37, 133.24, 132.84, 131.44, 131.10, 130.85, 129.20, 128.61, 128.30, 127.93, 127.14, 53.76, 35.28, 35.24, 35.09, 31.82.

Next, 0.35 g of the compound 1-8, 0.35 g of the compound 1-7, 51.3 mg of paramethoxyphenol and 0.95 g of ammonium acetate were dissolved in 6.5 mL of acetic acid, and the solution was heated at 80° C. for 5 days, neutralized with aqueous ammonia and extracted with dichloromethane. The dichloromethane layer was concentrated, and the product was separated by silica gel column chromatography to give 0.54 g of compound 1-9.

Compound 1-9

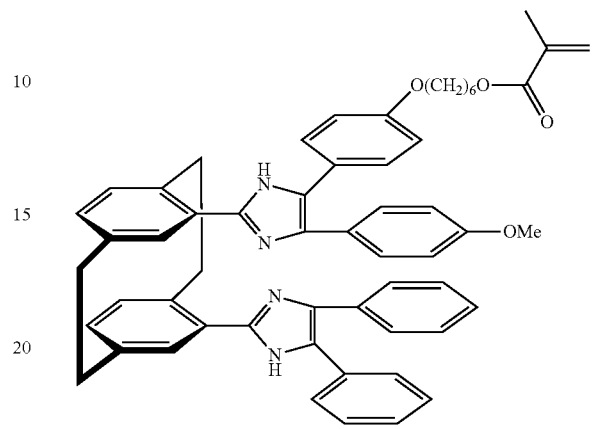

The measurement results of $^1$H-NMR and $^{13}$C-NMR of the compound 1-9 are shown below.

$^1$H-NMR (500 MHz, CDCl$_3$) δ: 9.06 (br, 2H), 7.39-7.30 (br, 3H), 7.14-6.98 (m, 12H), 6.73-6.61 (m, 9H), 6.10 (s, 1H), 5.55 (s, 1H), 4.23-4.15 (m, 4H), 3.91-3.88 (m, 4H), 3.76 (s, 3H), 3.20-3.12 (m, 6H), 1.94 (s, 3H), 1.85-1.71 (m, 4H), 1.54-1.43 (m, 4H).

$^{13}$C-NMR (125 MHz, CDCl$_3$) δ: 167.49, 146.21, 145.51, 139.66, 137.51, 136.65, 136.28, 133.27, 132.95, 130.46, 128.88, 128.08, 125.39, 67.81, 64.81, 55.29, 35.31, 35.13, 29.36, 28.72, 25.96, 18.48.

Next, 0.49 g of the compound 1-9 was dissolved in 90 mL of benzene and stirred. 65 mL of an aqueous solution in which 3.28 g of potassium hydroxide and 9.63 g of potassium ferricyanide were dissolved was added dropwise thereto. The benzene layer was washed with water, and the product was separated by silica gel column chromatography to give 0.3 g of compound 1-10.

Compound 1-10

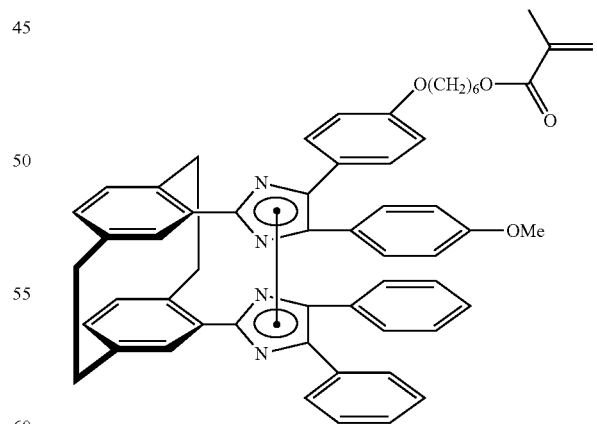

The measurement results of $^1$H-NMR and $^{13}$C-NMR of the compound 1-10 are shown below.

$^1$H-NMR (500 MHz, CDCl$_3$) δ: 7.47 (br, 1H), 7.31-7.03 (m, 15H), 6.92 (br, 1H), 6.82 (dd, J=9.0 Hz, 2H), 6.71 (dd, J=9.5 Hz, 2H), 6.64-6.61 (m, 2H), 6.48 (d, J=7.5 Hz, 1H), 6.42 (d, J=8.0 Hz, 1H), 6.09 (br, 1H), 5.54 (br, 1H), 4.54-4.51

(m, 1H), 4.18-4.15 (m, 2H), 4.00-3.93 (m, 2H), 3.84-3.80 (m, 3H), 3.33-2.94 (m, 7H), 1.94 (m, 3H), 1.83-1.70 (m, 4H), 1.55-1.42 (m, 4H).

$^{13}$C-NMR (125 MHz, CDCl$_3$) δ: 167.95, 164.69, 147.42, 141.21, 138.34, 137.48, 136.84, 136.34, 134.98, 134.76, 133.78, 133.19, 132.82, 132.56, 132.05, 131.81, 128.52, 128.39, 128.29, 128.09, 127.19, 126.37, 125.57, 114.06, 113.71, 113.62, 113.26, 111.91, 68.17, 64.92, 55.68, 55.61, 35.65, 35.57, 34.78, 34.46, 29.42, 28.89, 26.14, 18.67.

Next, an example of a method for the synthesis of a polymer by using the photochromic molecule monomer synthesized as above is shown below.

60 mg of the compound 1-10 and 0.26 mg of 2,2'-azobis (2,4-dimethylvaleronitrile) were dissolved in 200 μL of THF and put in a freezing ampule, freezing deaeration was conducted ten times, and the ampule was sealed. This solution was warmed to 40° C. and reacted for 3 days under stirring. Thereafter the reaction liquid was dissolved in dichloromethane and purified by reprecipitation by adding dropwise the solution to methanol. The precipitated solid was collected by filtration to give 33.2 mg of a polymer of the photochromic molecule (homopolymer 1-1). The weight average molecular weight was measured by GPC and found to be 28,400.

Homopolymer 1-1

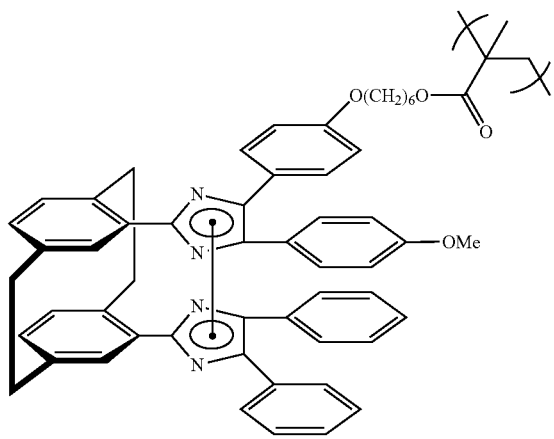

Polymers of other photochromic molecules can also be synthesized in a similar manner by suitably selecting the starting substance.

<Test 1 on Homopolymer of Example 1>

0.5 mg of the homopolymer 1-1 synthesized as above was weighed and dissolved in 10 mL of dichloromethane. This solution was put into a tetrahedral quartz cell, and the transient absorption of the polymer was measured by time-resolved spectroscopy. As the result thereof, as shown in FIG. 1, it was found that the polymer had a longer half-life of the colored body than that in the state of a monomer, and thus the reaction velocity from the colored body to a decolored body was successively retarded in an efficient manner.

<Test 2 on Homopolymer of Example 1>

2.5 mg of the homopolymer 1-1 synthesized as above was weighed and dissolved in 50 μL of chloroform. 10 μL of this solution was put on a cover glass and casted by spin coat to prepare a film of the photochromic polymer.

Figure 9:
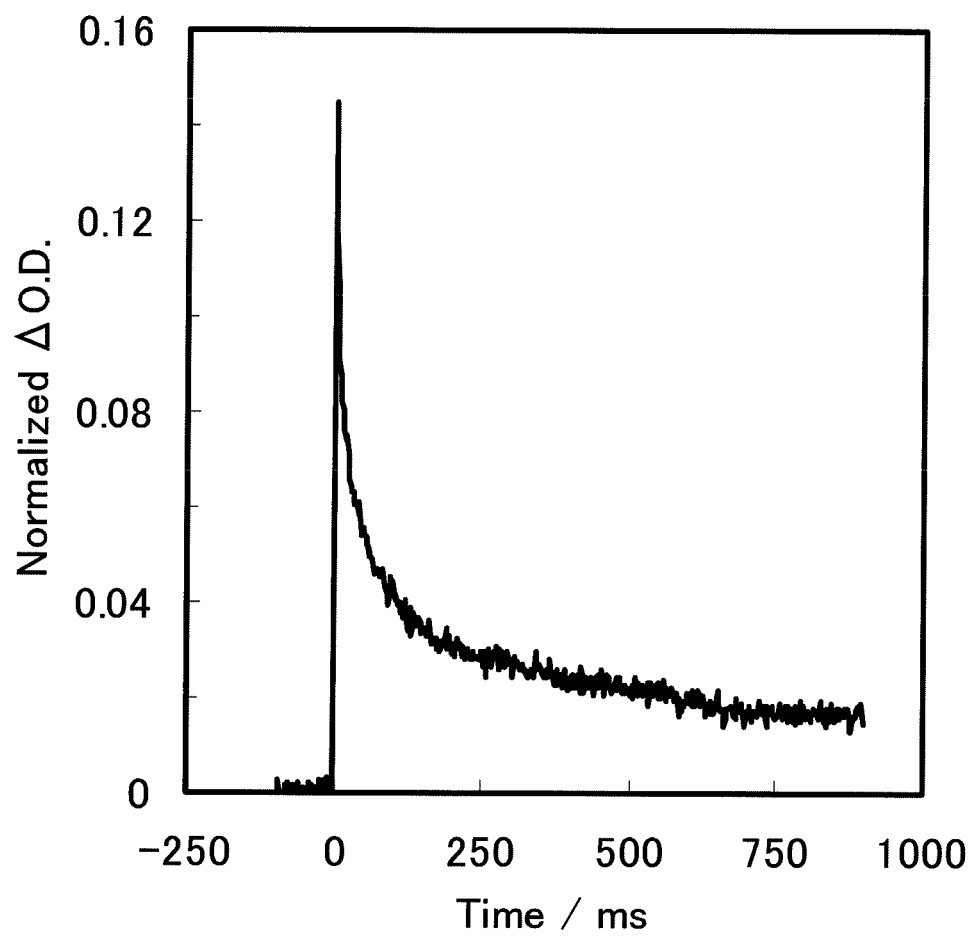
FIG. 9 shows the result of the transient absorption measurement of the film of the homopolymer 1-1.

The transient absorption of the colored body of the film of the photochromic polymer (homopolymer 1-1) was measured by time-resolved spectroscopy. The film was irradiated with excitation light at a wavelength of 355 nm (third harmonic of Nd-YAG laser), and the absorption at 400 nm was detected. As the result thereof, as shown in FIG. 9, a component developing a color was present even at 800 millisecond after the irradiation of excitation light, and thus the reaction velocity from the colored body to a decolored body was successively retarded in an efficient manner.

Example 2

Copolymer of Photochromic Polymer 40 mg of the compound 1-10, 4 mg of the compound 1-7, 3.74 mg of methyl methacrylate and 0.7 mg of 2,2'-azobis(2, 4-dimethylvaleronitrile) were dissolved in 267 μL of THF and put in a freezing ampule, freezing deaeration was conducted ten times, and the ampule was sealed. This solution was warmed to 40° C. and reacted for 3 days under stirring. Thereafter the reaction liquid was dissolved in dichloromethane, and purified by reprecipitation by adding dropwise the solution to methanol. The precipitated solid was collected by filtration to give 33.3 mg of a copolymer of the photochromic molecule (homopolymer 1-10), the photosensitizing compound (compound 1-7) and methyl methacrylate. The weight average molecular weight was measured by GPC and found to be 19,500.

<Test 1 on Copolymer of Example 2>

Figure 2:
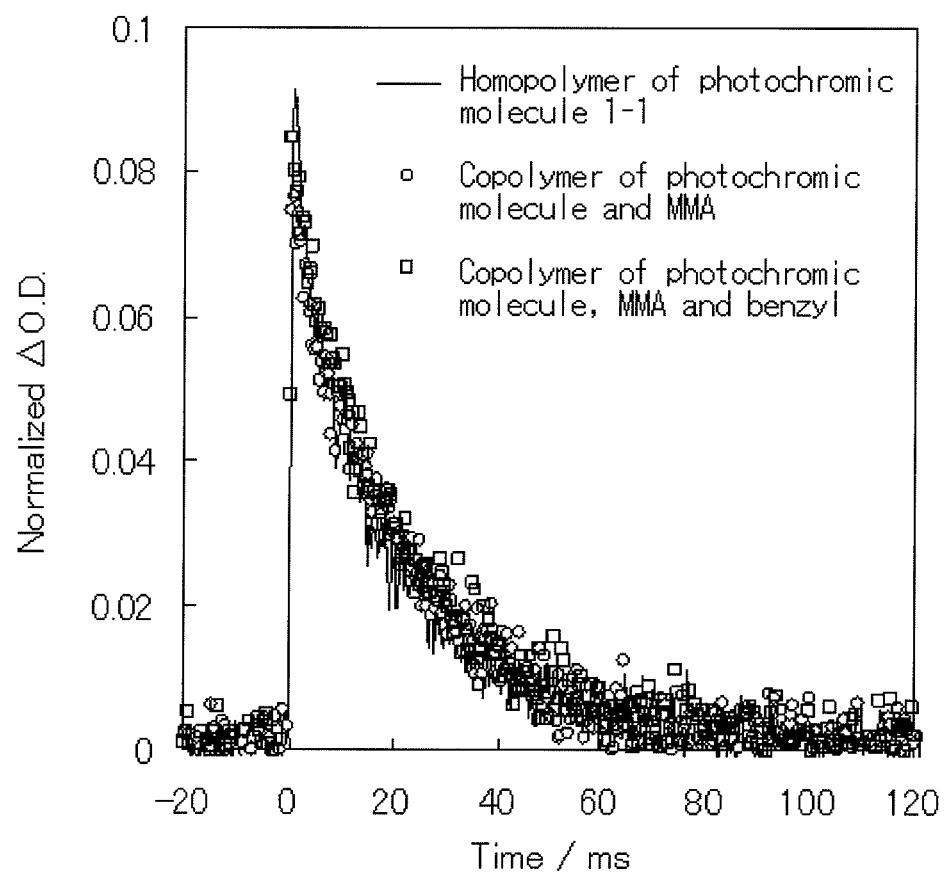
FIG. 2 shows the comparison of the results of the transient absorption measurements between the homopolymer and copolymers.
Figure 3:
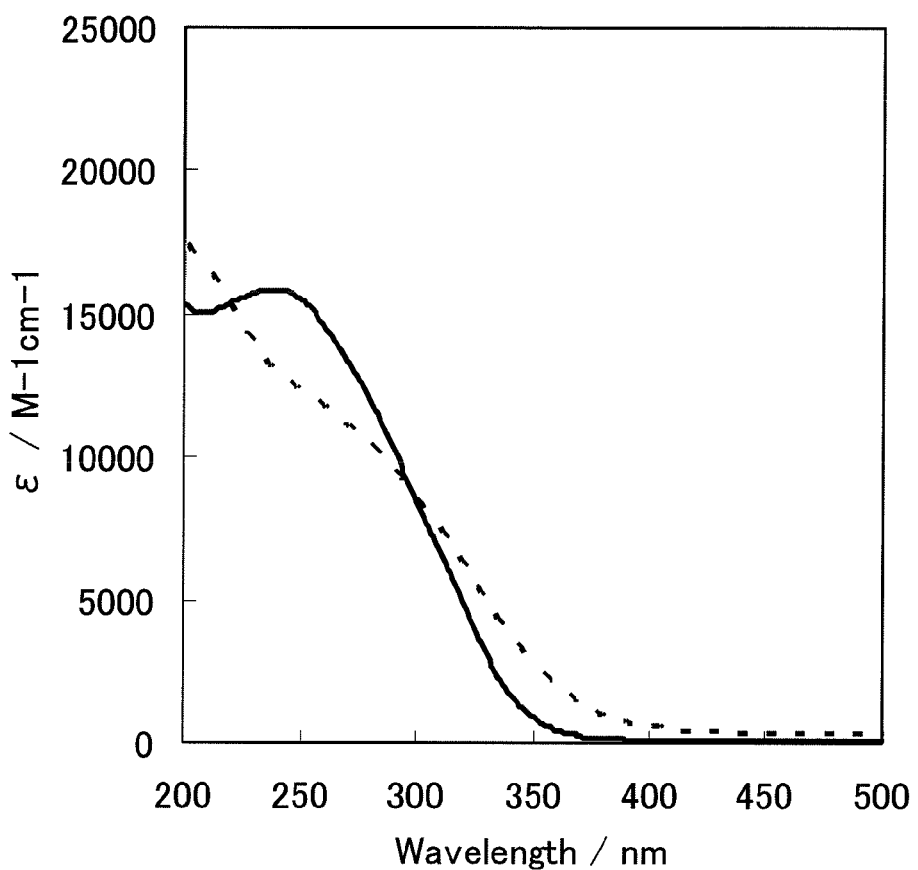
FIG. 3 shows the comparison of the ultraviolet-visible absorption spectra between the decolored bodies of a photochromic molecule wherein $R_4$ to $R_7$ are hydrogens and of a photochromic molecule wherein $R_4$ to $R_7$ are methoxy groups.

0.5 mg of the random copolymer of the photochromic molecule (compound 1-10) and the photosensitizing compound (compound 1-7) synthesized as above was weighed and dissolved in 10 mL of dichloromethane. This solution was put into a tetrahedral quartz cell, and the transient absorption of the polymer was measured by time-resolved spectroscopy. As the result thereof, as shown in FIG. 2, it was found that the copolymer also had a similar colored body half-life to that of the homopolymer 1-1, and thus the decoloration reaction velocity was retarded successively in a more efficient manner than that in the polymer.

<Test 2 on Copolymer of Example 2>

Figure 10:
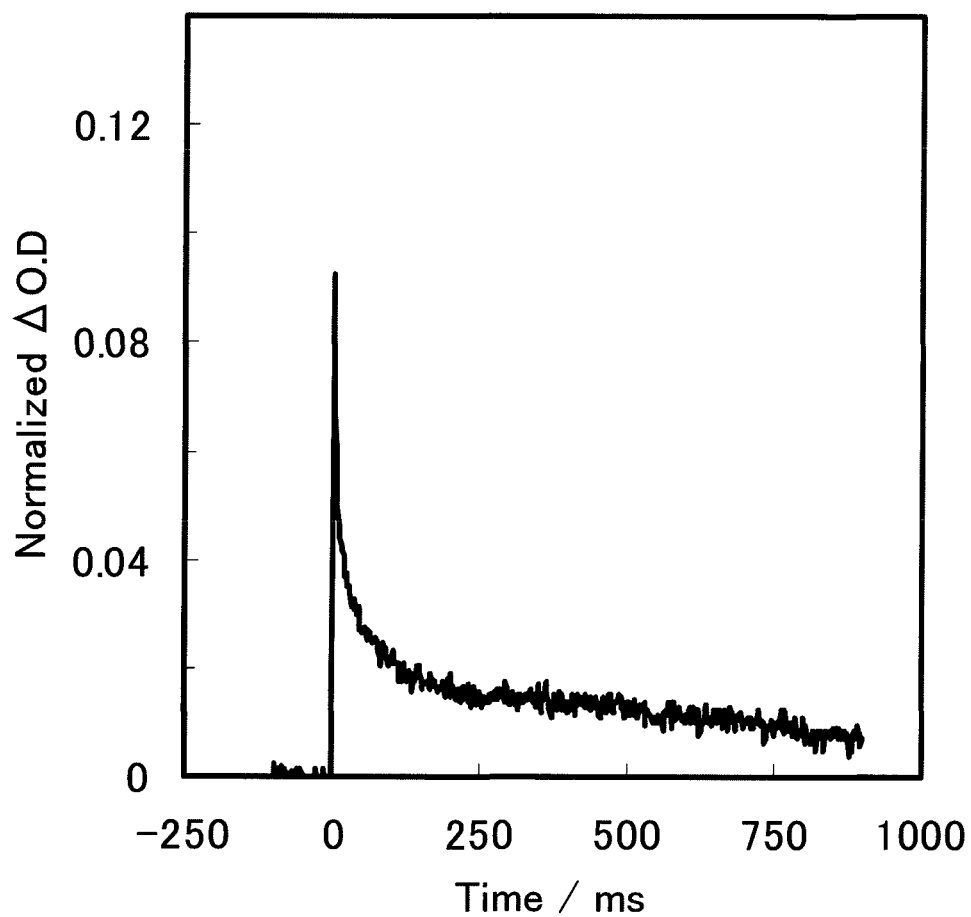
FIG. 10 shows the transient absorption measurement of the film of the copolymer of the compound 1-10, compound 1-7 and methyl methacrylate.

A film of the photochromic polymer was prepared in a similar manner to that in Test 2 on the homopolymer of Example 1, and a transient absorption measurement was conducted. As the result thereof, as shown in FIG. 10, a component developing a color was present even at 800 millisecond after the irradiation of excitation light also in the film of the copolymer as in the result of the homopolymer, and thus the reaction velocity from the colored body to a decolored body was successively retarded in an efficient manner.

Example 3

Homopolymer of Photochromic Polymer

First, 0.5 g of the compound 1-4, 0.63 g of the compound 1-11 and 2.19 g of ammonium acetate were dissolved in 8 mL of acetic acid, and heated at 100° C. for 5 hours. The reaction solution was neutralized with aqueous ammonia, and the product was extracted with dichloromethane. The dichloromethane layer was concentrated, and the product was separated by silica gel column chromatography to give 0.48 g of compound 1-12.

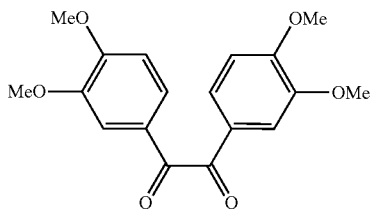

Compound 1-11

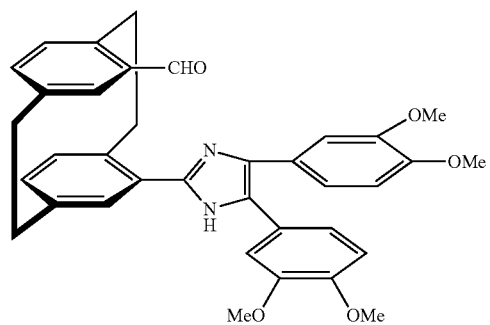

Compound 1-12

The measurement results of $^1$H-NMR and $^{13}$C-NMR of the compound 1-12 are shown below.

$^1$H-NMR (500 MHz, CDCl$_3$) δ: 9.82 (s, 1H), 9.19 (s, 1H), 7.32-7.26 (m, 2H), 7.13-7.12 (m, 1H), 7.09-7.08 (m, 2H), 6.89-6.83 (m, 2H), 6.79-6.77 (m, 1H), 6.69-6.68 (m, 2H), 6.63-6.61 (m, 2H), 4.27-4.25 (m, 1H), 4.02-4.00 (m, 1H), 3.90 (s, 6H), 3.88 (s, 6H), 3.13-3.03 (m, 6H).

$^{13}$C-NMR (125 MHz, CDCl$_3$) δ: 190.44, 149.24, 149.12, 148.96, 148.28, 144.73, 144.27, 140.38, 140.12, 138.23, 138.06, 137.87, 136.74, 136.47, 136.10, 132.86, 132.67, 131.23, 130.88, 128.45, 127.51, 124.19, 121.18, 120.24, 112.21, 111.63, 111.43, 111.33, 56.25, 56.22, 56.02, 35.33, 35.20, 35.06, 31.58.

Next, 0.46 g of the compound 1-12, 0.35 g of the compound 1-7, 51.3 mg of paramethoxyphenol and 0.95 g of ammonium acetate were dissolved in 6.5 mL of acetic acid, and the solution was heated at 80° C. for 5 days, neutralized with aqueous ammonia and extracted with dichloromethane. The dichloromethane layer was concentrated, and the product was separated by silica gel column chromatography to give 0.65 g of compound 1-13.

Compound 1-13

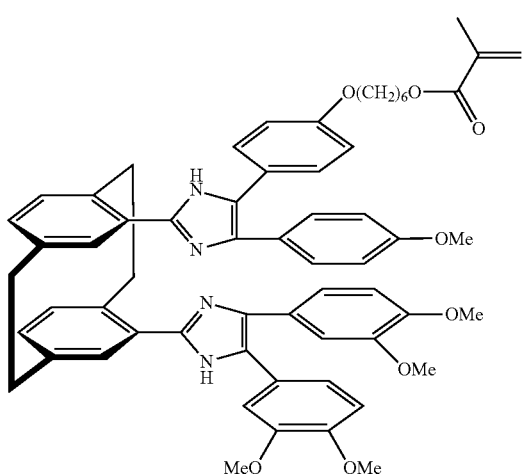

The measurement results of $^1$H-NMR and $^{13}$C-NMR of the compound 1-13 are shown below.

$^1$H-NMR (500 MHz, DMSO-d$_6$) δ: 11.47-11.42 (m, 2H), 7.13-7.08 (m, 4H), 7.01-6.98 (m, 1H), 6.92-6.86 (m, 3H), 6.78-6.76 (m, 3H), 6.69-6.51 (m, 9H), 6.02 (br, 1H), 5.66 (br, 1H), 4.61-4.45 (m, 2H), 4.11 (t, J=6.0 Hz, 2H), 3.89-3.79 (m, 2H), 3.75-3.58 (m, 15H), 3.13-3.01 (m, 6H), 1.88 (s, 3H), 1.76-1.65 (m, 4H), 1.50-1.35 (m, 4H).

$^{13}$C-NMR (125 MHz, CDCl$_3$) δ: 167.88, 148.91, 148.03, 145.93, 145.78, 139.94, 136.85, 136.63, 136.42, 133.54, 133.13, 130.71, 129.59, 128.67, 126.85, 125.86, 125.58, 123.91, 120.73, 120.34, 114.74, 114.19, 113.58, 111.72, 111.33, 111.17, 68.30, 68.02, 64.98, 56.10, 55.95, 55.45, 35.75, 35.58, 35.04, 34.57, 30.66, 29.55, 28.93, 26.19, 25.95, 18.68.

Next, 0.56 g of the compound 1-13 was dissolved in 100 mL of benzene and stirred. 70 mL of an aqueous solution in which 3.61 g of potassium hydroxide and 10.6 g of potassium ferricyanide were dissolved was added dropwise thereto. The benzene layer was washed with water, and the product was separated by silica gel column chromatography to give 0.52 g of compound 1-14.

Compound 1-14

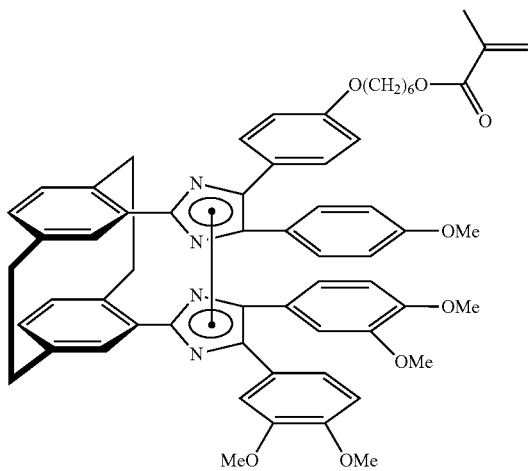

The measurement results of $^1$H-NMR and $^{13}$C-NMR of the compound 1-14 are shown below.

$^1$H-NMR (500 MHz, CDCl$_3$) δ: 7.30-6.42 (m, 22H), 6.10 (br, 1H), 5.55 (br, 1H), 4.61-4.45 (m, 1H), 4.17-4.12 (m, 2H), 3.99-3.89 (m, 2H), 3.91-3.55 (m, 15H), 3.35-2.90 (m, 7H), 1.94 (m, 3H), 1.85-1.62 (m, 4H), 1.50-1.35 (m, 4H).

$^{13}$C-NMR (125 MHz, CDCl$_3$) δ: 167.86, 151.85, 141.74, 136.83, 136.49, 136.36, 136.12, 132.44, 132.23, 131.07, 131.00, 130.90, 129.51, 129.16, 128.83, 128.59, 128.55, 126.92, 126.44, 125.93, 125.85, 125.59, 115.08, 114.98, 114.81, 114.66, 114.37, 64.95, 64.90, 55.63, 55.59, 54.51, 35.41, 35.03, 34.85, 34.56, 33.17, 31.92, 30.66, 29.45, 29.39, 28.91, 28.87, 26.17, 26.08, 26.06, 22.98, 21.52, 18.67, 14.45.

Next, an example of a method for the synthesis of a polymer by using the photochromic molecule monomer synthesized as above is shown below.

60 mg of the compound 1-14 and 0.23 mg of 2,2'-azobis(2,4-dimethylvaleronitrile) were dissolved in 200 μL of THF and put in a freezing ampule, freezing deaeration was conducted ten times, and the ampule was sealed. This solution was warmed to 40° C. and reacted for 3 days under stirring. Thereafter the reaction liquid was dissolved in dichloromethane, and purified by reprecipitation by adding dropwise the solution to methanol. The precipitated solid was collected by filtration to give 22.3 mg of a polymer of the photochromic molecule (homopolymer 1-2). The weight average molecular weight was measured by GPC, and consequently found to be 9,500.

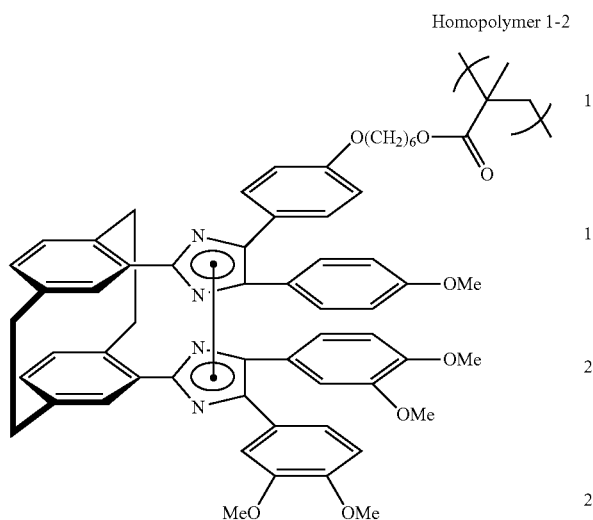

Homopolymer 1-2

<Test 1 on Homopolymer of Example 3>

Figure 5:
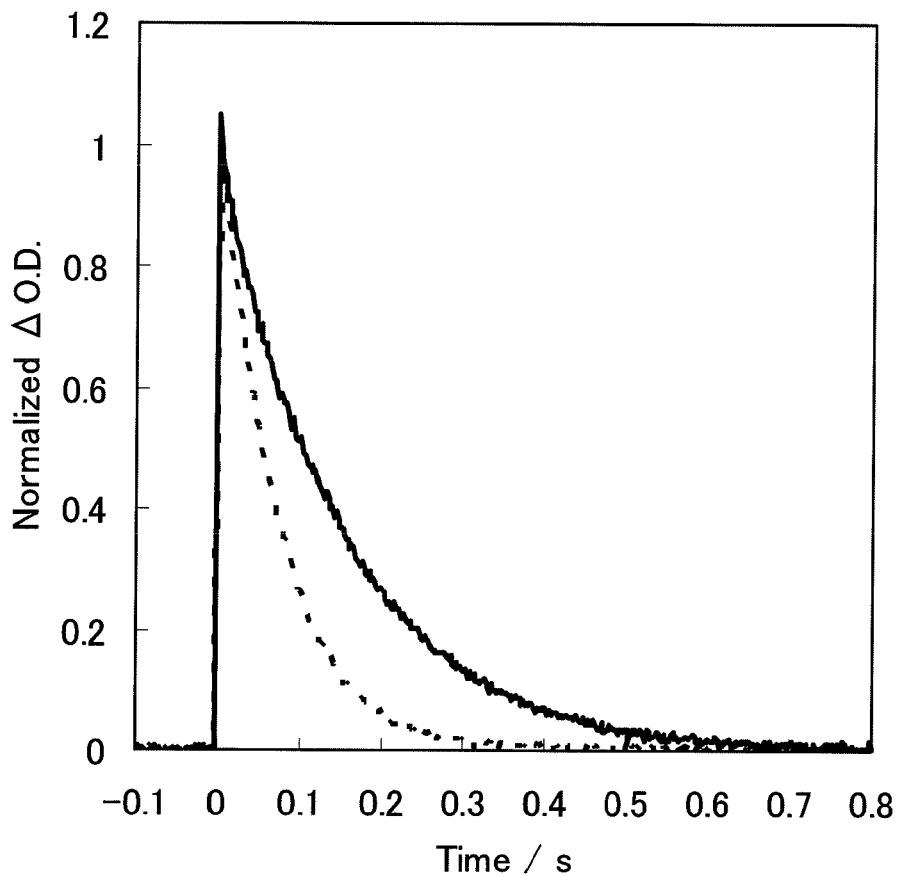
FIG. 5 shows the comparison of the transient absorption measurements between the homopolymer of the photochromic molecule wherein $R_4$ to $R_7$ are methoxy groups and the monomer of the photochromic molecule wherein $R_4$ to $R_7$ are methoxy groups.

0.5 mg of the homopolymer 1-2 synthesized as above was weighed and dissolved in 10 mL of dichloromethane. This solution was put into a tetrahedral quartz cell, and the transient absorption of the polymer was measured by time-resolved spectroscopy. As the result thereof, as shown in FIG. 5, it was found that the polymer had a longer half-life of the colored body than that in the state of a monomer, and thus the reaction velocity from the colored body to a decolored body was successively retarded in an efficient manner.

<Test 2 on Homopolymer of Example 3>

2.5 mg of the homopolymer 1-2 synthesized as above was weighed and dissolved in 50 μL of chloroform. 10 μL of this solution was put on a cover glass and casted by spin coat to prepare a film of the photochromic polymer.

Figure 11:
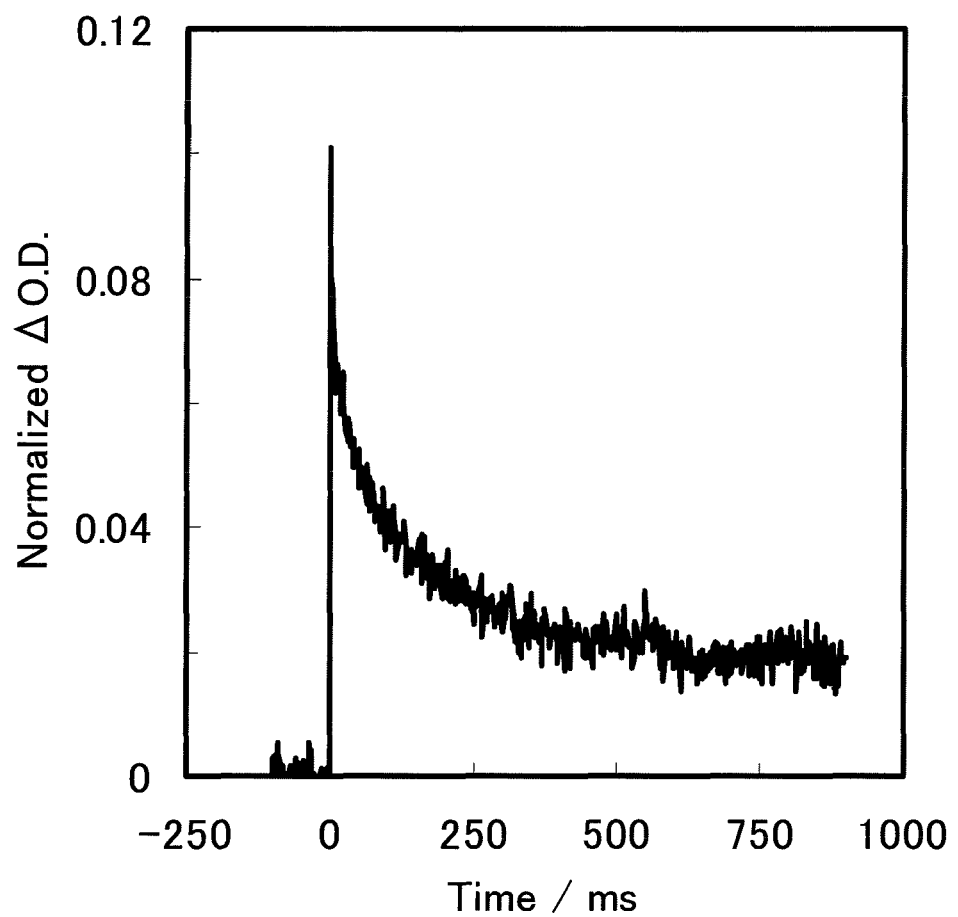
FIG. 11 shows the result of the transient absorption measurement of the film of the homopolymer 1-2.

The transient absorption of the colored body of the film of the photochromic polymer (homopolymer 1-2) was measured by time-resolved spectroscopy. The film was irradiated with excitation light at a wavelength of 355 nm (third harmonic of Nd-YAG laser), and the absorption at 400 nm was detected. As the result thereof, as shown in FIG. 11, a component developing a color was present even at 800 millisecond after the irradiation of excitation light, and thus the reaction velocity from the colored body to a decolored body was successively retarded in an efficient manner.

INDUSTRIAL APPLICABILITY

A method for decreasing the decoloration reaction velocity of a photochromic molecule by polymerizing the photochromic molecule has been shown. By using this method, the decoloration reaction velocity of a photochromic molecule in which a colored body is not accumulated since the decoloration reaction velocity is too fast and thus the coloration concentration is low can be decreased, and it becomes possible to provide a photochromic molecule material that provides fine coloring.

The invention claimed is:

1. A homopolymer of a photochromic molecule represented by the following general formula (III):

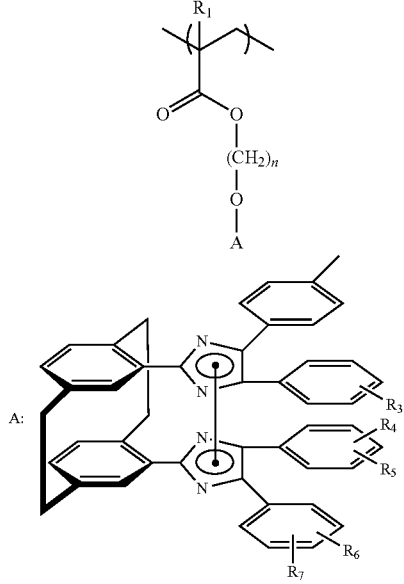

General formula (III)

wherein, in the structural formula, A is a photochromic molecule having the above-mentioned structure, $R_1$ is hydrogen or a methyl group, and n is an integer of 2 to 20, wherein $R_3$ is a methoxy group and is bound to the para-position, and $R_4$ to $R_7$ are all methoxy groups and are bound to the meta-positions and para-positions.

2. A block or random copolymer of a photochromic molecule represented by the following general formula (IV):

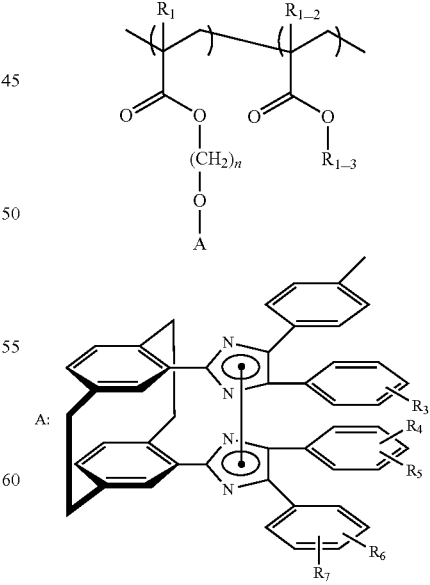

General formula (IV)

wherein, in the structural formula, A is a photochromic molecule having the above-mentioned structure, $R_1$, $R_{1-2}$ and $R_{1-3}$ are each independently hydrogen or a methyl group, $R_3$ to $R_7$ are each independently hydrogen or an alkoxy group, and n is an integer of 2 to 20.

3. A block or random copolymer of a photochromic molecule represented by the following general formula (V):

General formula (V)

wherein, in the structural formula, A is a photochromic molecule having the above-mentioned structure, B is a photosensitizing compound having the above-mentioned structure, $R_1$, $R_{1-2}$, $R_{1-3}$ and $R_{1-4}$ are each independently hydrogen or a methyl group, $R_3$ to $R_8$ are each independently hydrogen or an alkoxy group, m is an integer of 2 to 20, and n is an integer of 2 to 20.

4. A block or random copolymer of a photochromic molecule represented by the following general formula (VI):

General formula (VI)

wherein, in the structural formula, A is a photochromic molecule having the above-mentioned structure, B is a photosensitizing compound having the above-mentioned structure, $R_1$ and $R_{1-2}$ are each independently hydrogen or a methyl group, $R_3$ to $R_8$ are each independently hydrogen or an alkoxy group, m is an integer of 2 to 20, and n is an integer of 2 to 20.

5. A block or random copolymer of a photochromic molecule represented by the following general formula (VII):

General formula (VII)

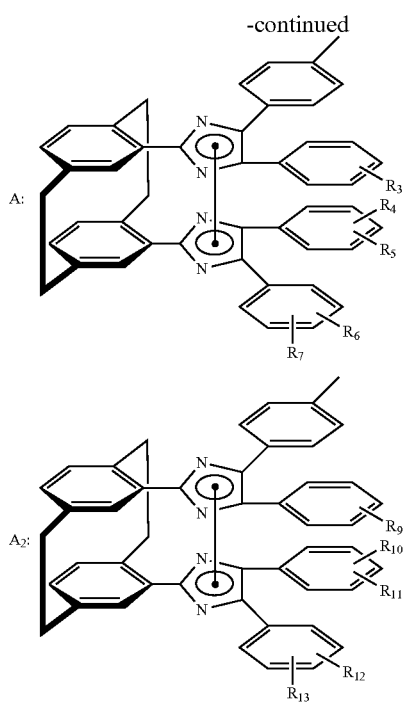

wherein, in the structural formula, A and $A_2$ are photochromic molecules having the above-mentioned structures, $R_1$ and $R_{1-2}$ are each independently hydrogen or a methyl group, $R_3$ and $R_9$ are each independently hydrogen or an alkoxy group, $R_4$ to $R_7$ are hydrogens, $R_{10}$ to $R_{13}$ are alkoxy groups, m is an integer of 2 to 20, and n is an integer of 2 to 20.

6. The copolymer of a photochromic molecule according to claim 2, wherein $R_3$ to $R_7$ are each independently hydrogen or a methoxy group.

7. The copolymer of a photochromic molecule according to claim 6, wherein $R_3$ is a methoxy group and is bound to the para-position, and $R_4$ to $R_7$ are all hydrogens.

8. The copolymer of a photochromic molecule according to claim 6, wherein $R_3$ is a methoxy group and is bound to the para-position, and $R_4$ to $R_7$ are all methoxy groups and are bound to the meta-positions and para-positions.

9. The copolymer of a photochromic molecule according to claim 3, wherein $R_3$ to $R_8$ are each independently hydrogen or a methoxy group.

10. The copolymer of a photochromic molecule according to claim 9, wherein $R_3$ and $R_8$ are methoxy groups and are bound to the para-positions, and $R_4$ to $R_7$ are all hydrogens.

11. The copolymer of a photochromic molecule according to claim 9, wherein $R_3$ and $R_8$ are methoxy groups and are bound to the para-positions, and $R_4$ to $R_7$ are all methoxy groups and are bound to the meta-positions and para-positions.

12. The copolymer of a photochromic molecule according to claim 4, wherein $R_3$ to $R_8$ are each independently hydrogen or a methoxy group.

13. The copolymer of a photochromic molecule according to claim 12, wherein $R_3$ and $R_8$ are methoxy groups and are bound to the para-positions, and $R_4$ to $R_7$ are all hydrogens.

14. The copolymer of a photochromic molecule according to claim 12, wherein $R_3$ and $R_8$ are methoxy groups and are bound to the para-positions, and $R_4$ to $R_7$ are all methoxy groups and are bound to the meta-positions and para-positions.

15. The copolymer of a photochromic molecule according to claim 5, wherein $R_3$ and $R_9$ are methoxy groups and are bound to the para-positions, $R_4$ to $R_7$ are all hydrogens, and $R_{10}$ to $R_{13}$ are methoxy groups and are bound to the meta-positions and para-positions.

16. A method for decreasing the decoloration reaction rate of a photochromic material, comprising polymerizing a photochromic molecule to form the homopolymer according to claim 1.

17. A method for controlling the photosensitivity and color tone of a photochromic material, by changing the component ratio of the photochromic molecule having the structure A and the photochromic molecule having the structure $A_2$ in the copolymer of photochromic molecules according to claim 5.

18. A method for decreasing the decoloration reaction rate of a photochromic material, comprising polymerizing a photochromic molecule to form the copolymer according to claim 2.

19. A method for decreasing the decoloration reaction rate of a photochromic material, comprising polymerizing a photochromic molecule to form the copolymer according to claim 3.

20. A method for decreasing the decoloration reaction rate of a photochromic material, comprising polymerizing a photochromic molecule to form the copolymer according to claim 4.

21. A method for decreasing the decoloration reaction rate of a photochromic material, comprising polymerizing a photochromic molecule to form the copolymer according to claim 5.

22. A method for controlling the photosensitivity and color tone of a photochromic material, by changing the component ratio of the photochromic molecule having the structure A and the photochromic molecule having the structure $A_2$ in the copolymer of photochromic molecules according to claim 15.

* * * * *